United States Patent
Chorvath et al.

(12) 
(10) Patent No.: US 6,417,293 B1
(45) Date of Patent: Jul. 9, 2002

(54) THERMOPLASTIC SILICONE ELASTOMERS FORMED FROM POLYESTER RESINS

(75) Inventors: Igor Chorvath; Craig Steven Gross, both of Midland; Kenneth Gerard Gruszynski, Essexville; Michael Kang-Jen Lee; Jun Liao, both of Midland, all of MI (US); Koji Nakanishi, Ichihara (JP); Richard Leroy Rabe; David Joseph Romenesko, both of Midland, MI (US)

(73) Assignee: Dow Corning Corporation, Midland, MI (US)

( * ) Notice: Subject to any disclaimer, the term of this patent is extended or adjusted under 35 U.S.C. 154(b) by 30 days.

(21) Appl. No.: 09/728,920

(22) Filed: Dec. 4, 2000

(51) Int. Cl.$^7$ .......................... C08L 67/06; C08L 83/05; C08L 83/07
(52) U.S. Cl. .......................... 525/446; 524/86; 524/89; 524/95; 524/292; 524/478; 524/588; 524/862; 528/15; 528/31; 528/32
(58) Field of Search .............................. 524/86, 89, 95, 524/292, 478, 588, 862; 525/446; 528/15, 31, 32

(56) References Cited

U.S. PATENT DOCUMENTS

| | | | |
|---|---|---|---|
| 4,500,688 A | 2/1985 | Arkles | 525/431 |
| 4,695,602 A | 9/1987 | Crosby et al. | 524/439 |
| 4,714,739 A | 12/1987 | Arkles | 525/92 |
| 4,775,712 A | 10/1988 | Sasaki et al. | 524/504 |
| 4,803,244 A | 2/1989 | Umpleby | 525/105 |
| 4,831,071 A | 5/1989 | Ward et al. | 524/401 |
| 4,849,469 A | 7/1989 | Crsby et al. | 524/439 |
| RE33,070 E | 9/1989 | Arkles | 525/431 |
| 4,970,263 A | 11/1990 | Arkles et al. | 525/92 |
| 5,648,426 A | 7/1997 | Zolotnitsky | 525/100 |
| 6,013,715 A | 1/2000 | Gornowicz et al. | 524/492 |
| 6,281,286 B1 * | 8/2001 | Chorvath et al. | 524/862 |

FOREIGN PATENT DOCUMENTS

| | | |
|---|---|---|
| EP | 0 279 414 | 8/1988 |
| EP | 0 506 465 | 9/1992 |
| EP | 0 651 009 | 5/1995 |
| WO | WO 96/01291 | 1/1996 |

OTHER PUBLICATIONS

U.S. application No. 09/390,029, Chorvath et al., filed Aug. 28, 2001.
Ciba Specialty Chemicals, "Additives for Specialty Polymers and Products—Key Products Selection Guide." 1998.
Shell Chemical Company, "Corterra Polymers—PTT Tech Data Sheet CP509200." 1999.
Eastman Chemical Co., "Processing Buide for the Medical Industry".

* cited by examiner

Primary Examiner—Robert Dawson
Assistant Examiner—Marc S. Zimmer
(74) Attorney, Agent, or Firm—Alexander Weitz; Alan Zombeck

(57) ABSTRACT

The present invention, therefore, relates to a method for preparing a thermoplastic elastomer, said method comprising:

(I) mixing
  (A) a thermoplastic resin comprising more than 50 percent by volume of a polyester resin other than poly (butylene terephthalate), said thermoplastic resin having a softening point of 23° C. to 300° C.,
  (B) a silicone elastomer comprising
    (B') 100 parts by weight of a diorganopolysiloxane gum having a plasticity of at least 30 and having an average of at least 2 alkenyl groups in its molecule and, optionally,
    (B") up to 200 parts by weight of a reinforcing filler, the weight ratio of said silicone elastomer (B) to said thermoplastic resin (A) being greater than 35:65 to 85:15,
  (C) 0.01 to 5 parts by weight of a stabilizer for each 100 parts by weight of said thermoplastic resin and said silicone elastomer,
  (D) an organohydrido silicon compound which contains an average of at least 2 silicon-bonded hydrogen groups in its molecule and
  (E) a hydrosilation catalyst, components (D) and (E) being present in an amount sufficient to cure said diorganopolysiloxane (B'); and
(II) dynamically curing said diorganopolysiloxane (B').

34 Claims, No Drawings

THERMOPLASTIC SILICONE ELASTOMERS FORMED FROM POLYESTER RESINS

FIELD OF THE INVENTION

The present invention relates to a thermoplastic elastomer composition wherein a silicone gum and a stabilizer are dispersed in a polyester resin and the silicone gum is dynamically vulcanized in the resulting mixture.

BACKGROUND OF THE INVENTION

Thermoplastic elastomers (TPEs) are polymeric materials which possess both plastic and rubbery properties. They have elastomeric mechanical properties but, unlike conventional thermoset rubbers, they can be re-processed at elevated temperatures. This re-processability is a major advantage of TPEs over chemically crosslinked rubbers since it allows recycling of fabricated parts and results in a considerable reduction of scrap.

In general, two main types of thermoplastic elastomers are known. Block copolymer thermoplastic elastomers contain "hard" plastic segments which have a melting point or glass transition temperature above ambient as well as "soft" polymeric segments which have a glass transition or melt point considerably below room temperature. In these systems, the hard segments aggregate to form distinct microphases and act as physical crosslinks for the soft phase, thereby imparting a rubbery character at room temperature. At elevated temperatures, the hard segments melt or soften and allow the copolymer to flow and to be processed like an ordinary thermoplastic resin.

Alternatively, a thermoplastic elastomer referred to as a simple blend, or physical blend, can be obtained by uniformly mixing an elastomeric component with a thermoplastic resin. When the elastomeric component is also crosslinked during mixing, a thermoplastic elastomer known in the art as a thermoplastic vulcanizate (TPV) results. Since the crosslinked elastomeric phase of a TPV is insoluble and non-flowable at elevated temperature, TPVs generally exhibit improved oil and solvent resistance as well as reduced compression set relative to the simple blends.

Typically, a TPV is formed by a process known as dynamic vulcanization, wherein the elastomer and the thermoplastic matrix are mixed and the elastomer is cured with the aid of a crosslinking agent and/or catalyst during the mixing process. A number of such TPVs are known in the art, including some wherein the crosslinked elastomeric component can be a silicone polymer while the thermoplastic component is an organic, non-silicone polymer (i.e., a thermoplastic silicone vulcanizate or TPSiV). In such a material, the elastomeric component can be cured by various mechanisms including radical, condensation and hydrosilylation method, but each method has its limitations.

Arkles, in U.S. Pat. No. 4,500,688, discloses semi-interpenetrating networks (semi-IPNs) wherein a vinyl-containing silicone fluid having a viscosity of 500 to 100,000 cS is dispersed in a conventional thermoplastic resin. Arkles only illustrates these IPNs at relatively low levels of silicone. The vinyl-containing silicone is vulcanized in the thermoplastic during melt mixing according to a chain extension or crosslinking mechanism which employs a silicon hydride-containing silicone component. Typical thermoplastics mentioned include polyesters, polyurethanes, styrenics, polyacetals and polycarbonates. This disclosure is expanded by Arkles in U.S. Pat. No. 4,714,739 to include the use of hybrid silicones which contain unsaturated groups and are prepared by reacting a hydride-containing silicone with an organic polymer having unsaturated functionality. Although Arkles discloses a silicone fluid content ranging from 1 to 40 weight percent (1 to 60% in the case of the '739 patent), there is no suggestion of any criticality as to these proportions or to the specific nature of the organic resin.

Crosby et al., in U.S. Pat. No. 4,695,602, teach composites wherein a silicone semi-IPN vulcanized via a hydrosilation reaction is dispersed in a fiber-reinforced thermoplastic resin having a high flexural modulus. The silicones employed are of the type taught by Arkles, cited supra, and the composites are said to exhibit improved shrinkage and warpage characteristics relative to systems which omit the IPN.

Ward et al., in U.S. Pat. No. 4,831,07 1, disclose a method for improving the melt integrity and strength of a high modulus thermoplastic resin to provide smooth-surfaced, high tolerance profiles when the modified resin is melt-drawn. As in the case of the disclosures to Arkles et al., cited supra, a silicone mixture is cured via a hydrosilation reaction after being dispersed in the resin to form a semi-IPN, after which the resulting composition is extruded and melt-drawn.

U.S. Pat. No. 6,013,715 to Gornowicz et al. teaches the preparation of TPSiV elastomers wherein a silicone gum (or filled silicone gum) is dispersed in either a polyolefin or a poly(butylene terephthalate) resin and the gum is subsequently dynamically vulcanized therein via a hydrosilation cure system. The resulting elastomers exhibit an ultimate elongation at break of at least 25% and have significantly improved mechanical properties over the corresponding simple blends of resin and silicone gum in which the gum is not cured (i.e., physical blends). This is, of course, of great commercial significance since the vulcanization procedure, and the cure agents required therefor, add to both the complexity as well as the expense of the preparation and vulcanization would be avoided in many applications if essentially identical mechanical properties could be obtained without its employ. However, this patent specifically teaches that poly(ethylene terephthalate) resin, as well as other thermoplastic resins, could not be modified according to the disclosed method.

Although the above publications disclose the preparation of compositions using various thermoplastic resins as the matrix and a dispersed phase consisting of a silicone oil or elastomer which is dynamically vulcanized therein, neither these references, nor any art known to applicants, teach the preparation of TPSiV elastomers based on polyester resins having superior tensile and elongation properties, as disclosed herein.

SUMMARY OF THE INVENTION

It has now been discovered that TPSiV elastomers of the type described in above cited U.S. Pat. No. 6,013,715 can be prepared from various polyester resins, including poly(ethylene terephthalate). As in the case of the teachings of U.S. Pat. No. 6,013,715, the elastomers disclosed herein generally also have good appearance and have a tensile strength and/or elongation at least 25% greater than that of the corresponding simple (physical) blend wherein the diorganopolysiloxane is not cured. However, it has been surprisingly found that such properties are significantly enhanced when a minor portion of a stabilizer is incorporated in the formulation, this resulting in a TPSiV having an elongation of at least 30%. Furthermore, unlike the teachings of Arkles, cited supra, and others, the silicone component which is dispersed in the thermoplastic resin, and dynamically cured therein, must include a high molecular weight gum, rather than a low viscosity silicone fluid, the latter resulting in compositions having poor uniformity. Surprisingly, polyesters having a softening point greater than about 300° C. could not be modified according to the present invention to prepare TPSiVs having the required 30% elongation.

The present invention, therefore, relates to a method for preparing a thermoplastic elastomer, said method comprising:

(I) mixing (A) a thermoplastic resin comprising more than 50 percent by volume of a polyester resin other than poly (butylene terephthalate), said thermoplastic resin having a softening point of 23° C. to 300° C., (B) a silicone elastomer comprising (B') 100 parts by weight of a diorganopolysiloxane gum having a plasticity of at least 30 and having an average of at least 2 alkenyl groups in its molecule and, optionally, (B") up to 200 parts by weight of a reinforcing filler, the weight ratio of said silicone elastomer (B) to said thermoplastic resin (A) being greater than 35:65 to 85:15, (C) 0.01 to 5 parts by weight of a stabilizer for each 100 parts by weight of said thermoplastic resin and said silicone elastomer, (D) an organohydrido silicon compound which contains an average of at least 2 silicon-bonded hydrogen groups in its molecule and (E) a hydrosilation catalyst, components (D) and (E) being present in an amount sufficient to cure said diorganopolysiloxane (B'); and (II) dynamically curing said diorganopolysiloxane (B'), wherein said thermoplastic elastomer has an elongation of at least 30% and wherein at least one property of the thermoplastic elastomer selected from tensile strength or elongation is at least 25% greater than the respective property for a corresponding simple blend wherein said diorganopolysiloxane is not cured.

The invention further relates to a thermoplastic elastomer which is prepared by the above method.

DETAILED DESCRIPTION OF THE INVENTION

Component (A) of the present invention is (A') a saturated thermoplastic polyester resin, other than poly(butylene terephthalate), or a blend of at least one such polyester resin with (A") a non-polyester, saturated thermoplastic resin, wherein the polyester resin (A') comprises more than 50 percent of the blend volume. For the purposes of the invention, the polyester resin (A') and the optional thermoplastic resin (A") have a softening point of at least about 23° C. but no greater than about 300° C. Herein, the "softening point" corresponds to the respective melting point of the thermoplastic resin if this resin (or blend) is at least partially crystalline and corresponds to the glass transition temperature when the thermoplastic resin is completely amorphous. When the softening point is below about 23° C., the resin is not a thermoplastic. Rather, such a material would already have an elastomeric character and modification thereof according to the method of the present invention would not be productive. On the other hand, a polyester resin, or resin blend, having a softening point greater than about 300° C. can not be formulated into thermoplastic elastomers by the instant method. Preferably, the softening point is between 50° C. and 300° C. and most preferably between 200° C. and 300° C. Further, as used herein, the term "saturated thermoplastic" indicates that the resin does not contain aliphatic unsaturation.

Specific examples of resins which can comprise the saturated thermoplastic polyester of component (A') include homopolymers such as poly(ethylene terephthalate) (PET), poly(trimethylene terephthalate) (PTT), poly(ethylene naphthalate) (PEN), poly(butylene naphthalate) (PBN), and poly(cyclohexylenedimethylene terephthalate) (PCT), inter alia. Alternatively, the polyester (A') can be a random, graft or block copolymer having more than 50 mole percent of its repeat units derived from the condensation of an organic diacid and an organic diol. Such copolymers can comprise (a) recurring structural units, wherein each structural unit comprises a diol residue and a diacid residue and wherein from 50 to 100 mol percent of the structural units comprise a divalent alicyclic hydrocarbon group as the diol residue of the structural unit (e.g., PCT and glycol modified polycyclohexyl terephthalate (PCT-G)); (b) recurring structural units, wherein each structural unit comprises a diol residue and a diacid residue and from 0 to less than 50% of the structural units comprise a divalent alicyclic hydrocarbon radical as the diol residue of the structural unit (e.g., PET-G); and (c) recurring structural units, wherein each structural unit comprises a diol residue and a diacid residue and wherein from 10 to less than 90% of the structural units comprise a divalent alicyclic hydrocarbon radical as the 3diol residue of the structural unit and from 10 to 90% of the structural units comprise a 2,6-naphythalene dicarboxylate group as the diacid residue of the structural unit. When the polyester resin contains two or more blocks having independent thermal transition temperatures, the above mentioned softening point refers to the higher melt point or glass transition temperature.

Saturated thermoplastic polyester resins are well known in the art and further description thereof is considered unnecessary.

It is preferred that the polyester resin is dried prior to use, as generally recommended by the manufacturer. This is typically accomplished by passing a dry air or inert gas stream over as-received resin pellets or powder at elevated temperatures. The degree of drying consistent with optimal ultimate elastomer properties depends on the particular polyester and other components of the invention and is readily determined by a few simple experiments for the system under consideration.

Optional thermoplastic resin (A") is any saturated resin other than a polyester having a softening point of 23° C. to 300° C. The nature of this component is not critical provided it does not contain functional groups which would prevent the dynamic vulcanization of the silicone gum (B"). It may be illustrated by thermoplastic resins such as polycarbonates (PC), acrylonitrile-butadiene-styrene terpolymers (ABS), polyamides, polystyrene, poly(phenylene oxide) (PPO), polypropylene (PP), thermoplastic polyolefins (TPO), polyetherimide (PEI) and polyketones, inter alia.

Silicone elastomer (B) is a diorganopolysiloxane gum (B') or, optionally, a uniform blend of this gum with a reinforcing filler (B").

Diorganopolysiloxane (B') is a high consistency (gum) polymer or copolymer which contains at least 2 alkenyl groups having 2 to 20 carbon atoms in its molecule. The alkenyl group is specifically exemplified by vinyl, allyl, butenyl, pentenyl, hexenyl and decenyl. The position of the alkenyl functionality is not critical and it may be bonded at the molecular chain terminals, in non-terminal positions on the molecular chain or at both positions. It is preferred that the alkenyl group is vinyl or hexenyl and that this group is present at a level of 0.001 to 3 weight percent, preferably 0.01 to 1 weight percent, in the diorganopolysiloxane gum.

The remaining (i.e., non-alkenyl) silicon-bonded organic groups in component (B') are independently selected from hydrocarbon or halogenated hydrocarbon groups which contain no aliphatic unsaturation. These may be specifically exemplified by alkyl groups having 1 to 20 carbon atoms, such as methyl, ethyl, propyl, butyl, pentyl and hexyl; cycloalkyl groups, such as cyclohexyl and cycloheptyl; aryl groups having 6 to 12 carbon atoms, such as phenyl, tolyl and xylyl; aralkyl groups having 7 to 20 carbon atoms, such as benzyl and phenethyl; and halogenated alkyl groups having 1 to 20 carbon atoms, such as 3,3,3-trifluoropropyl and chloromethyl. It will be understood, or course, that these groups are selected such that the diorganopolysiloxane gum (B') has a glass temperature (or melt point) which is below room temperature and the gum is therefore elastomeric. Methyl preferably makes up at least 50, more preferably at least 90, mole percent of the non-alkenyl silicon-bonded organic groups in component (B').

Thus, diorganopolysiloxane (B') can be a homopolymer or a copolymer containing such organic groups. Examples include gums comprising dimethylsiloxy units and phenylmethylsiloxy units; dimethylsiloxy units and diphenylsiloxy units; and dimethylsiloxy units, diphenylsiloxy units and phenylmethylsiloxy units, among others. The molecular structure is also not critical and is exemplified by linear and partially branched straight-chain, linear structures being preferred.

Specific illustrations of organopolysiloxane (B') include:
trimethylsiloxy-endblocked dimethylsiloxane-methylhexenylsiloxane copolymers;
dimethylhexenylsiloxy-endblocked dimethylsiloxane-methylhexenylsiloxane copolymers;
trimethylsiloxy-endblocked dimethylsiloxane-methylvinylsiloxane copolymers;
trimethylsiloxy-endblocked methylphenylsiloxane-dimethylsiloxane-methylvinylsiloxane copolymers; dimethylvinylsiloxy-endblocked dimethylpolysiloxanes;
dimethylvinylsiloxy-endblocked dimethylsiloxane-methylvinylsiloxane copolymers;
dimethylvinylsiloxy-endblocked methylphenylpolysiloxanes;
dimethylvinylsiloxy-endblocked methylphenylsiloxane-dimethylsiloxane-methylvinylsiloxane copolymers; and similar copolymers wherein at least one end group is dimethylhydroxysiloxy. Preferred systems for low temperature applications include methylphenylsiloxane-dimethylsiloxane-methylvinylsiloxane copolymers and diphenylsiloxane-dimethylsiloxane-methylvinylsiloxane copolymers, particularly wherein the molar content of the dimethylsiloxane units is about 93%.

Component (B') may also include combinations of two or more organopolysiloxanes. Most preferably, component (B') is a polydimethylsiloxane homopolymer which is terminated with a vinyl group at each end of its molecule or is such a homopolymer which also contains at least one vinyl group along its main chain.

For the purposes of the present invention, the molecular weight of the diorganopolysiloxane gum is sufficient to impart a Williams plasticity number of at least about 30 as determined by the American Society for Testing and Materials (ASTM) test method 926. The plasticity number, as used herein, is defined as the thickness in millimeters×100 of a cylindrical test specimen 2 cm$^3$ in volume and approximately 10 mm in height after the specimen has been subjected to a compressive load of 49 Newtons for three minutes at 25° C. When the plasticity of this component is less than about 30, as in the case of the low viscosity fluid siloxanes employed by Arkles, cited supra, the TPSiVs prepared by dynamic vulcanization according to the instant method exhibit poor uniformity such that at high silicone contents (e.g., 50 to 70 weight percent) there are regions of essentially only silicone and those of essentially only thermoplastic resin, and the compositions are weak and friable. These gums are considerably more viscous than the silicone fluids employed in the prior art. For example, silicones contemplated by Arkles, cited supra, have an upper viscosity limit of 100,000 cS (0.1 m$^2$/s) and, although the plasticity of fluids of such low viscosity are not readily measured by the ASTM D 926 procedure, it was determined that this corresponds to a plasticity of approximately 24. Although there is no absolute upper limit on the plasticity of component (B'), practical considerations of processability in conventional mixing equipment generally restrict this value. Preferably, the plasticity number should be about 100 to 200, most preferably about 120 to 185.

Methods for preparing high consistency unsaturated group-containing polydiorganosiloxanes are well known and they do not require a detailed discussion in this specification. For example, a typical method for preparing an alkenyl-functional polymer comprises the base-catalyzed equilibration of cyclic and/or linear diorganopolysiloxanes in the presence of similar alkenyl-functional species.

Component (B") is a finely divided filler which is known to reinforce diorganopolysiloxane (B') and is preferably selected from finely divided, heat stable minerals such as fumed and precipitated forms of silica, silica aerogels and titanium dioxide having a specific surface area of at least about 50 m$^2$/gram. The fumed form of silica is a preferred reinforcing filler based on its high surface area, which can be up to 450 m$^2$/gram and a fumed silica having a surface area of 50 to 400 m$^2$/g, most preferably 200 to 380 m$^2$/g, is highly preferred. Preferably, the fumed silica filler is treated to render its surface hydrophobic, as typically practiced in the silicone rubber art. This can be accomplished by reacting the silica with a liquid organosilicon compound which contains silanol groups or hydrolyzable precursors of silanol groups. Compounds that can be used as filler treating agents, also referred to as anti-creeping agents or plasticizers in the silicone rubber art, include such ingredients as low molecular weight liquid hydroxy- or alkoxy-terminated polydiorganosiloxanes, hexaorganodisiloxanes, cyclodimethylsilazanes and hexaorganodisilazanes. It is preferred that the treating compound is an oligomeric hydroxy-terminated diorganopolysiloxane having an average degree of polymerization (DP) of 2 to about 100, more preferably about 2 to about 10, and it is used at a level of about 5 to 50 parts by weight for each 100 parts by weight of the silica filler. When component (B') is the preferred vinyl-functional or hexenyl-functional polydimethylsiloxane, this treating agent is preferably a hydroxy-terminated polydimethylsiloxane.

When reinforcing filler (B") is employed, it is added at a level of up to 200 parts by weight, preferably 5 to 150 and most preferably 20 to 100 parts by weight, for each 100 parts by weight of gum (B') to prepare silicone elastomer (B). Such a blend is commonly termed a "base" by those skilled in the silicone art. Blending is typically carried out at room temperature using a two-roll mill, internal mixer or other suitable device. Alternatively, a reinforcing filler-containing silicone elastomer can be formed in-situ during mixing, but prior to dynamic vulcanization of the gum, as further described infra. In the latter case, the temperature of mixing is kept below the melting point of the polyester resin until the reinforcing filler is well dispersed in the diorganopolysiloxane gum.

Stabilizer (C) is at least one organic compound selected from hindered phenols; thioesters; hindered amines; 2,2'-(1, 4-phenylene)bis(4H-3, 1-benzoxazin-4-one); or 3,5-di-tert-butyl-4-hydroxybenzoic acid, hexadecyl ester. We have surprisingly observed that other classes of stabilizers recommended for formulating polyester compositions, such as organophosphites, do not impart the significant improvement in mechanical properties obtained with the stabilizers of the invention. Moreover, as shown in the examples below, some of the organophosphites actually contribute to the premature crosslinking of the silicone gum (i.e., before any catalyst is introduced), thereby interfering with the intended dynamic vulcanization.

For the purposes of the present invention, a hindered phenol is an organic compound having at least one group of the formula

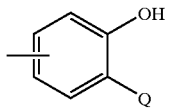

(i)

in its molecule, wherein Q is a monovalent organic group having 1 to 24 carbon atoms selected from hydrocarbon groups, hydrocarbon groups which optionally contain heteroatoms selected from sulfur, nitrogen or oxygen or halogen-substituted versions of the aforementioned groups. Examples of Q include groups such as alkyl, aryl, alkylaryl, arylalkyl, cycloalkyl and halogen-substituted version thereof; alkoxy groups having 1 to 24 carbon atoms, such as methoxy or t-butoxy; and hydrocarbon groups having 2 to 24 carbon atoms which contain heteroatoms (e.g., —CH$_2$—S—R", —CH$_2$—O—R" or —CH$_2$—C (O)OR", wherein R" is a hydrocarbon group having 1 to 18 carbon atoms). Further, although not explicitly shown in formula (i), it is also contemplated that the benzene ring may additionally be substituted with one or more of the above described Q groups. The residue of the organic compound to which group (i) is chemically bonded is not critical as long as it does not contain moieties which would interfere with the dynamic vulcanization, described infra. For example, this residue may be a hydrocarbon, a substituted hydrocarbon or a hetero atom-containing hydrocarbon group of the appropriate valence. It is also contemplated that the group according to formula (i) can be attached to hydrogen to form an organophenol. Preferably, the hindered phenol compound has a number average molecular weight of less than about 3,000.

A preferred hindered phenol compound contains at least one group of the formula

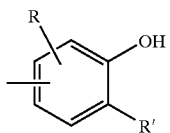

(ii)

in its molecule wherein the benzene ring may be optionally further substituted with hydrocarbon groups having 1 to 24 carbon atoms. In formula (ii), R is an alkyl group having one to four carbon atoms and R' is a hydrocarbon group having 4 to 8 carbon atoms.

Preferably, one to four of the groups shown in structures (i) or (ii) are attached to an organic residue of appropriate valence such that the contemplated compound has a molecular weight (MW) of less than about 1,500. Most preferably, four such groups are present in component (C) and this compound has a molecular weight of less than about 1,200. This monovalent (or polyvalent) organic residue can contain one or more heteroatoms such as oxygen, nitrogen, phosphorous and sulfur. The R' groups in the above formula may be illustrated by t-butyl, n-pentyl, butenyl, hexenyl, cyclopentyl, cyclohexyl and phenyl. It is preferred that both R and R' are t-butyl. For the purposes of the present invention, a group according to formula (ii) can also be attached to hydrogen to form a diorganophenol.

Non-limiting specific examples of suitable hindered phenols include 1,1,3-Tris(2'-methyl-4'-hydroxy-5'-t-butylphenyl)butane, N,N'-hexamethylene bis(3-(3,5-di-t-butyl-4-hydroxyphenyl)propionamide), 4,4'-thiobis(2-t-butyl-5-methylphenol), 1,3,5-tris(4-tert-butyl-3-hydroxy-2,6-dimethyl benzyl)-1,3,5-triazine-2,4,6-(1H,3H,5H)-trione, N,N'-hexamethylenebis(3,5-di-tert-butyl-4-hydroxyhydrocinnamamide), tetrakis(methylene(3,5-di-tert-butyl-4-hydroxy-hydrocinnamate))methane, 1,3,5-trimethyl-2,4,6-tris (3,5-di-tert-butyl-4-hydroxybenzyl) benzene, 4,4'-methylenebis (2,6-di-tertiary-butylphenol), 2,2'-thiobis(6-tert-butyl-4-methylphenol), 2,2'-thiobis( 4-octylphenol), 4,4'-thiobis(6-tert-butyl-2-methylphenol), 4,4'-thiobis(3,6-di-sec-amylphenol), 2-(4,6-bis(2,4-dimethylphenyl)-1,3,5,-triazin-2-yl)-5-(octyloxy) phenol, 2,4-bisoctylmercapto-6-(3,5-di-tert-butyl-4-hydroxyanilino)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl) isocyanurate, 1,3,5-tris(4-tert-butyl-3-hydroxy-2,6-dimethylbenzyl) isocyanurate, 2,6-di-tert-butyl-4-methoxyphenol, 2,5-di-tert-butylhydroquinone, 2,5-di-tert-amylhydroquinone, 2,6-di-tert-butylhydroquinone, 2,5-di-tert-butyl-4-hydroxyanisole, 2,6-diphenyl-4-octadecyloxyphenol, 3,5-di-tert-butyl-4-hydroxyanisole, 3,5-di-tert-butyl-4-hydroxyphenyl stearate, bis(3,5-di-tert-butyl-4-hydroxyphenyl) adipate, esters of beta-(3,5-di-tert-butyl-4-hydroxyphenyl)propionic acid with mono- or polyhydric alcohols (e.g., methanol, ethanol, n-octanol, trimethylhexanediol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, trimethylolpropane, tris(hydroxyethyl) isocyanurate, N,N'- bis(hydroxyethyl)oxalamide, 3-thiaundecanol, 3-thiapentadecanol, 4-hydroxymethyl-1-phospha-2,6,7-trioxabicyclo(2.2.2) octane and esters of beta-(5-tert-butyl-4-hydroxy-3-methylphenyl)propionic acid with mono- or polyhydric alcohols (as above).

Thioesters of the invention are compounds having at least one group of the formula

  (iii)

wherein G is —CH$_2$—CH$_2$—C(O)OR'" and R'" is a monovalent hydrocarbon group having 1 to 24 carbon atoms. Specific non-limiting examples of suitable thioesters include distearyl 3,3'-thiodipropionate, dilauryl-3,3'-thiodipropionate and di(tridecyl)3,3'-thiodipropionate.

The hindered amine of the present invention is a low molecular weight organic compound or a polymer which contains at least one divalent group of the formula

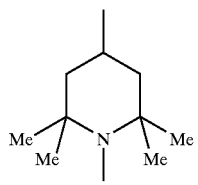  (iv)

wherein Me hereinafter denotes a methyl group. The backbone of this component is not critical as long as it does not contain functionality which would interfere with the dynamic vulcanization of the silicone gum and it may be illustrated by low-molecular and polymeric polyalkylpiperidines, as disclosed in U.S. Pat. No. 4,692,486, hereby incorporated by reference. Preferably, the above group has the structure

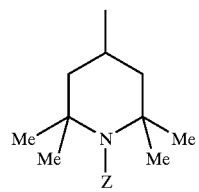  (v)

wherein Z is selected from hydrogen or an alkyl group having 1 to 24 carbon atoms, preferably hydrogen.

Specific non-limiting examples of suitable hindered amines include: 1,6-hexanediamine, N,N'-bis(2,2,6,6-pentamethyl-4-piperidinyl)-, polymers with morpholine-2,4,6-trichloro-1,3,5-triazine; 1,6-hexanediamine, N,N'-bis(2,2,6,6-tetramethyl-4-piperidinyl)-, polymers with 2,4,-Dichloro-6-(4-morpholinyl)-1,3,5-triazine; bis(1,2,2,6,6-pentamethyl-4-piperidinyl) sebacate; bis(2,2,6,6-tetramethyl-4-piperidinyl) sebacate; dimethyl succinate polymer with 4-hydroxy-2,2,6,6-tetramethyl-1-piperidine ethanol; and polymethyl (propyl-3-oxy-(2',2',6',6'-tetramethyl-4'-piperidinyl) siloxane.

Preferred stabilizers of the invention are tetrakis (methylene(3,5-di-tert-butyl-4-hydroxy-hydrocinnamate)) methane, N,N'-hexamethylenebis(3,5-di-tert-butyl-4-hydroxyhydrocinnamamide) and 1,1,3-tris(2'-methyl-4'-hydroxy-5'-t-butylphenyl)butane.

From about 0.01 to about 5 parts by weight of stabilizer (C) are employed for each 100 parts by weight of resin (A) plus silicone elastomer (B). It has been found that the mechanical properties of the final thermoplastic elastomer are significantly diminished when less than about 0.01 part of component (C) is used. This is particularly true when the polyester has a relatively high melting point, such as is the case for PEN and PCT resins. On the other hand, when the content of component (C) is greater than about 5 weight parts for each 100 parts by weight of (A) plus (B), little additional benefit is imparted. We have found that, in general, more stabilizer is required as the softening point of the resin approaches the 300° C. limit. With this guidance, the skilled artisan will readily determine the appropriate amount of stabilizer for any given system by routine experimentation. Preferably, 0.1 to 2 parts by weight, more preferably 0.1 to 1 part by weight, of (C) are added for each 100 parts by weight of (A) plus (B).

The organohydrido silicon compound (D) is a crosslinker (cure agent) for diorganopolysiloxane (B') of present composition and is an organopolysiloxane which contains at least 2 silicon-bonded hydrogen atoms in each molecule, but having at least about 0.1 weight percent hydrogen, preferably 0.2 to 2 and most preferably 0.5 to 1.7, percent hydrogen bonded to silicon. Those skilled in the art will, of course, appreciate that either component (B') or component (D), or both, must have a functionality greater than 2 if diorganopolysiloxane (B') is to be cured (i.e., the sum of these functionalities must be greater than 4 on average). The position of the silicon-bonded hydrogen in component (D) is not critical, and it may be bonded at the molecular chain terminals, in non-terminal positions along the molecular chain or at both positions. The silicon-bonded organic groups of component (D) are independently selected from any of the hydrocarbon or halogenated hydrocarbon groups described above in connection with diorganopolysiloxane (B'), including preferred embodiments thereof. The molecular structure of component (D) is also not critical and is exemplified by straight-chain, partially branched straight-chain, branched, cyclic and network structures, linear polymers or copolymers being preferred.

Component (D) is exemplified by the following:

low molecular siloxanes, such as PhSi(OSiMe$_2$H)$_3$;

trimethylsiloxy-endblocked methylhydridopolysiloxanes;

trimethylsiloxy-endblocked dimethylsiloxane-methylhydridosiloxane copolymers;

dimethylhydridosiloxy-endblocked dimethylpolysiloxanes;

dimethylhydrogensiloxy-endblocked methylhydrogenpolysiloxanes;

dimethylhydridosiloxy-endblocked dimethylsiloxane-methylhydridosiloxane copolymers;

cyclic methylhydrogenpolysiloxanes;

cyclic dimethylsiloxane-methylhydridosiloxane copolymers;

tetrakis(dimethylhydrogensiloxy)silane;

silicone resins composed of (CH$_3$)$_2$HSiO$_{1/2}$, (CH$_3$)$_3$SiO$_{1/2}$, and SiO$_{4/2}$ units; and silicone resins composed of (CH$_3$)$_2$HSiO$_{1/2}$, (CH$_3$)$_3$SiO$_{1/2}$, CH$_3$Si O$_{3/2}$, PhSiO$_{3/2}$ and SiO$_{4/2}$ units, wherein Ph hereinafter denotes phenyl group.

Particularly preferred organohydrido silicon compounds are polymers or copolymers with R"" HSiO units ended with either R""$_3$SiO$_{1/2}$ or HR""$_2$SiO$_{1/2}$, wherein R"" is independently selected from alkyl groups having 1 to 20 carbon atoms, phenyl or trifluoropropyl, preferably methyl. It is also preferred that the viscosity of component (D) is about 0.5 to 1,000 mPa- at 25° C., preferably 2 to 500 mPa-s. Further, this component preferably has 0.5 to 1.7 weight percent hydrogen bonded to silicon. It is highly preferred that component (D) is selected from a polymer consisting essentially of methylhydridosiloxane units or a copolymer consisting essentially of dimethylsiloxane units and methylhydridosiloxane units, having 0.5 to 1.7 percent hydrogen bonded to silicon and having a viscosity of 2 to 500 mPa–s at 25° C. Such a highly preferred system has terminal groups selected from trimethylsiloxy or dimethylhdridosiloxy groups. These SiH-functional materials are well known in the art and many of them are commercially available.

Component (D) may also be a combination of two or more of the above described systems and is used at a level such that the molar ratio of SiH therein to Si-alkenyl in component (B') is greater than 1 and preferably below about 50, more preferably 3 to 30, most preferably 4 to 20.

Hydrosilation catalyst (E) accelerates the cure of diorganopolysiloxane (B') in the present composition. This hydrosilation catalyst is exemplified by platinum catalysts, such as platinum black, platinum supported on silica, platinum supported on carbon, chloroplatinic acid, alcohol solutions of chloroplatinic acid, platinum/olefin complexes, platinum/alkenylsiloxane complexes, platinum/beta-diketone complexes, platinum/phosphine complexes and the like; rhodium catalysts, such as rhodium chloride and rhodium chloride/di(n-butyl)sulfide complex and the like; and palladium catalysts, such as palladium on carbon, palladium chloride and the like. Component (E) is preferably a platinum-based catalyst such as chloroplatinic acid; platinum dichloride; platinum tetrachloride; a platinum complex catalyst produced by reacting chloroplatinic acid and divinyltetramethyldisiloxane which is diluted with dimethylvinylsiloxy endblocked polydimethylsiloxane, prepared according to U.S. Pat. No. 3,419,593 to Willing; and a neutralized complex of platinous chloride and divinyltetramethyldisiloxane, prepared according to U.S. Pat. No. 5,175,325 to Brown et al. Most preferably, catalyst (E) is a neutralized complex of platinous chloride and divinyltetramethyldisiloxane.

Component (E) is added to the present composition in a catalytic quantity sufficient to promote the reaction of components (B') and (D) and thereby cure the diorganopolysiloxane to form an elastomer. The catalyst is typically added so as to provide about 0.1 to 500 parts per million (ppm) of metal atoms based on the total weight of the thermoplastic elastomer composition, preferably 0.25 to 100 ppm.

In addition to the above-mentioned components (A) through (E), a minor amount (i.e., less than about 40 weight percent of the total composition, preferably less than 20 weight percent) of an optional additive (F) can be incorporated in the compositions of the present invention. This optional additive can be illustrated by, but are not limited to, fillers, such as glass fibers and carbon fibers, quartz, talc, calcium carbonate, diatomaceous earth, iron oxide, carbon black and finely divided metals; lubricants; plasticizers; pigments; dyes; anti-static agents; blowing agents; heat stabilizers, such as hydrated cerric oxide; antioxidants; and fire retardant (FR) additives, such as halogenated hydrocarbons, alumina trihydrate, magnesium hydroxide and organophosphorous compounds. A preferred FR additive is calcium silicate particulate, preferably wollastonite having an average particle size of 2 to 30 $\mu$m. The FR additive can be incorporated in the silicone gum (B') or in resin (A), or in both.

The above additives are typically added to the final thermoplastic composition after dynamic cure, but they may also be added at any point in the preparation provided they do not adversely affect dynamic vulcanization. Of course, the above additional ingredients are only used at levels which do not significantly detract from the desired properties of the final composition.

According to the method of the present invention, the thermoplastic elastomer is prepared by thoroughly mixing silicone elastomer (B) and stabilizer (C) with resin (A) and then dynamically vulcanizing the diorganopolysiloxane using organohydrido silicon compound (D) and catalyst (E). For the purposes of the present invention, the weight ratio of silicone elastomer (B) to resin (A) is greater than 35:65. It has been found that when this ratio is 35:65 or less, the resulting vulcanizate has a modulus more resembling that of thermoplastic resin (A) than that of a thermoplastic elastomer. On the other hand, the above mentioned ratio should be no more than 85:15 since the compositions tend to be weak and resemble cured silicone elastomers above this value. Notwithstanding this upper limit, the maximum weight ratio of (B) to (A) for any given combination of components is also limited by processability considerations since too high a silicone elastomer content results in at least a partially crosslinked continuous phase which is no longer thermoplastic. For the purposes of the present invention, this practical limit is readily determined by routine experimentation and represents the highest level of component (B) which allows the TPSiV to be compression molded. It is, however, preferred that the final thermoplastic elastomer can also be readily processed in other conventional plastic operations, such as injection molding and extrusion and, in this case, the weight ratio of components (B) to (A) should be no more than about 75:25. Such a preferred thermoplastic elastomer which is subsequently re-processed generally has a tensile strength and elongation similar to the corresponding values for the original TPSiV (i.e., the thermoplastic elastomer is little changed by this re-processing). Although the amount of silicone elastomer consistent with the above mentioned requirements depends upon the particular polyester resin and other components selected, it is preferred that the weight ratio of components (B) to (A) is 40:60 to 75:25, more preferably 40:60 to 70:30.

Mixing is carried out in any device which is capable of uniformly dispersing the components in the polyester resin or resin blend, such as an internal mixer or an extruder, the latter being preferred for commercial preparations, wherein the temperature is preferably kept as low as practical consistent with good mixing so as not to degrade the resin. Depending upon the particular system, order of mixing is generally not critical and, for example, components (A), (C) and (D) can be added to (B) at a temperature above the softening point of (A), catalyst (E) then being introduced to initiate dynamic vulcanization. However, components (B) through (D) should be well dispersed in resin (A) before dynamic vulcanization begins. As previously mentioned, it is also contemplated that a reinforcing filler-containing silicone elastomer can be formed in-situ. For example, the optional reinforcing filler may be added to a mixer already containing resin (A) and diorganopolysiloxane gum (B') at a temperature below the softening point of the resin to thoroughly disperse the filler in the gum. The temperature is then raised to melt the resin, the other ingredients are added and mixing/dynamic vulcanization are carried out. Optimum temperatures, mixing times and other conditions of the mixing operation depend upon the particular resin and other components under consideration and these may be determined by routine experimentation by those skilled in the art. It is, however, preferred to carry out the mixing and dynamic vulcanization under a dry, inert atmosphere (i.e., one that does not adversely react with the components or otherwise hider hydrosilation cure), such as dry nitrogen, helium or argon.

A preferred procedure according to the instant method comprises forming a pre-mix by blending dried polyester resin (A), silicone elastomer (B), stabilizer (C) and, optionally, organohydrido silicon compound (D) below the softening point of the resin (e.g., at ambient conditions). This pre-mix is then melted in a bowl mixer or internal mixer, preferably using a dry inert gas purge, at a controlled temperature which is just above the softening of the resin to about 35° C. above this value and catalyst (E) is mixed therewith. Mixing is continued until the melt viscosity (mixing torque) reaches a steady state value, thereby indicating that dynamic vulcanization of the diorganopolysiloxane of component (B) is complete. Such a "cold-blend" procedure is particularly preferred when the melt point of the polyester resin is above about 280° C., as in the case of, e.g., PCT resin.

As noted above, in order to be within the scope of the present invention, the tensile strength or elongation, or both, of the TPSiVs must be at least 25% greater than that of a corresponding simple blend. A further requirement of the invention is that the TPSiV has at least 30% elongation, as determined by the test described infra. In this context, the term "simple blend" or "physical blend" denotes a composition wherein the weight proportions of resin (A), elastomer (B) and stabilizer (C) are identical to the proportions in the TPSiV, but no cure agents are employed (i.e., either component (D) or (E), or both, are omitted and the gum is therefore not cured). In order to determine if a particular composition meets the above criterion, the tensile strength of the TPSiV is measured on dumbbells having a length of 25.4 mm and a width of 3.2 mm and a typical thickness of 1 to 2 mm, according to ASTM method D 412, at an extension rate of 50 mm/min. Five samples are evaluated and the results averaged after removing obvious low readings due to sample inhomogeneity (e.g., such as voids, contamination or inclusions). These values are then compared to the corresponding average tensile and elongation values of a sample prepared from the simple blend composition. When at least a 25% improvement in tensile and/or elongation over the simple blend is not realized there is no benefit derived from the dynamic vulcanization and such compositions are not within the scope of the present invention.

The thermoplastic elastomer prepared by the above-described method can then be processed by conventional techniques, such as extrusion, vacuum forming, injection molding, blow molding or compression molding. Moreover, these compositions can be re-processed (recycled) with little or no degradation of mechanical properties.

The novel thermoplastic elastomers of the present invention can be used for fabricating parts and components for automotive, electronics, electrical, communications, appliance and medical applications, inter alia. For example, they may be used to produce wire and cable insulation; automotive and appliance components, such as belts, hoses, boots, bellows, gaskets, fuel line components and air ducts; architectural seals; bottle closures; furniture components; soft-feel grips for hand held devices (e.g. handles for tools); medical devices; sporting goods and general rubber parts.

EXAMPLES

The following examples are presented to further illustrate the compositions and method of this invention, but are not to be construed as limiting the invention, which is delineated in the appended claims. All parts and percentages in the examples are on a weight basis and all measurements were obtained at about 23° C., unless indicated to the contrary.

Materials

The following materials, listed alphabetically for ease of reference, were employed in the examples.

BASE 1 is a silicone rubber base made from 68.78% PDMS 1, defined infra, 25.8% of a fumed silica having a surface area of about 250 m$^2$/g (Cab-O-Sil® MS-75 by Cabot Corp., Tuscola, Ill.), 5.4% of a hydroxy-terminated diorganopolysiloxane having an average degree of polymerization (DP) of about 8 and 0.02% of ammonia.

BASE 2 is a silicone rubber base made from 76.68 % PDMS 1, defmed infra, 17.6 % of a fumed silica having a surface area of about 250 m$^2$/g, 5.7 % of a hydroxy-terminated diorganopolysiloxane having an average degree of polymerization (DP) of about 8 and 0.02% ammonium.

CATALYST 1 is a solution of one part of (i) a catalyst composition consisting essentially of 1.5% of a platinum complex of 1,3-diethenyl-1,1,3,3-tetramethyldisiloxane, 6.0% tetramethyldivinyldisiloxane, 92% of a dimethylvinyl ended polydimethylsiloxane and 0.5% of a dimethylcyclopolysiloxanes having 6 or greater dimethylsiloxane units diluted in four parts of (ii) a trimethylsiloxy-terminated polydimethylsiloxane oil having a viscosity of 1,000 cSt (1,000 m$^2$/s).

CATALYST 2 is the catalyst composition of CATALYST 1 which was not diluted with the polydimethylsiloxane oil.

IRGAFOS™ 168 is a phosphite stabilizer marketed by Ciba Specialty Chemicals Corporation and described as tris(2, 4-di-tert-butylphenyl)phosphite.

IRGANOX™ 1010 is a hindered phenol stabilizer marketed by Ciba Specialty Chemicals Corporation and described as tetrakis(methylene(3,5-di-tert-butyl-4-hydroxyhydrocinnamate))methane.

LCP is a liquid crystalline polyester resin marketed as VECTRA™ E950i by Ticona. Melt point=336° C.

PCT is a poly(cyclohexylenedimethylene terephthalate) marketed as THERMX® 13787 by Eastman Chemical Co., Kingsport, Tenn. Melt point=291° C.

PDMS 1 is a gum consisting of 99.81 wt % Me$_2$SiO units, 0.16% MeViSiO units and 0.03% Me$_2$ViSiO$_{1/2}$ units, wherein Vi hereinafter represents a vinyl group. Prepared by potassium catalyzed equilibration of cyclic siloxanes wherein the catalyst is neutralized with carbon dioxide. This gum has plasticity of about 150.

PDMS 2 is a gum similar to PDMS 1 but neutralized with both carbon dioxide and a silyl phosphate and having a plasticity of about 150.

PEN is a poly(ethylene naphthalate) marketed as Hipertuf™ 40043 by Shell Chemical Company, Akron, OH. Melt point=271° C.

PET 1 is a poly(ethylene terephthalate), marketed as Eastapac™ 7352 by Eastman Chemical Comp., Kingsport, Tenn. Melt points=240.5° C. and 252° C.

PET 2 is a poly(ethylene terephthalate), marketed as Eastapac™ 9663 by Eastman Chemical Comp. Melt point=2450° C.

PET 3 is a poly(ethylene terephthalate), marketed as Eastapac™ 9921 by Eastman Chemical Comp. Melt point=2350° C.

PET 4 is a poly(ethylene terephthalate), marketed as Amite™ A04 102 by DSM Engineering Plastics, Evansville, Ind. Melt points=244 and 253° C.

PET 5 is a poly(ethylene terephthalate), marketed as Arnite™ D04 300 by DSM Engineering Plastics. Melt point=2440° C.

PTT is a poly(trimethylene terephthalate), marketed as Corterra® CP 509200 by Shell Chemical Company, Houston, Tex. Melt point=228° C.

WESTON™ W618G is a distearyl pentaerythritol diphosphite stabilizer marketed by GE Specialty Chemicals, Morgantown, W.Va.

X-LINKER 1 is an SiH-functional crosslinker consisting essentially of 68.4% MeHSiO units, 28.1% Me$_2$SiO units and 3.5% Me$_3$SiO$_{1/2}$ units and has a viscosity of approximately 29 mPa·s. This corresponds to the average formula MD$_{16}$D'$_{39}$M, in which M is (CH$_3$)$_3$Si—O—, D is —Si(CH$_3$)$_2$—O— and D' is —Si(H)(CH$_3$)—O—.

In some of the following examples, mixing of components was started at a mixer temperature which was slightly below the melt point of the polyester resin employed in order to avoid degradation thereof as the actual temperature increased due to heat generated by the mixing process. In each case, the actual temperature of the mixed composition upon completion of vulcanization was above the resin melt point.

(COMPARATIVE) EXAMPLE A1

A physical blend was prepared by first drying PET 1 resin at 150° C. for 5 hours. (analysis confirmed moisture content of 0.001%). One hundred and twenty grams of BASE 1 were mixed at 100 rpm in a Haake Polylab™ bowl mixer (310 ml bowl; roller blades) at a temperature setting of 250° C., and after 4 minutes, 80.0 g of the dried PET 1 resin were added. The mixing torque increased to 1,500 m-g after a total time of 6 minutes. Torque remained constant during the final 13 minutes of processing, at which point a uniform blend was obtained (material temperature=264° C.; total time of mixing=19 minutes).

The above material was compression molded at 270° C. for 4 minutes under approximately 10 ton pressure (99 KPa) in a stainless steel Endura™ 310-2 Coated mold followed by cold pressing for 4 minutes. The tensile properties were measured on dumbbells having a length of 25.4 mm, width of 3.18 mm and a thickness of 1 to 2 mm, according to ASTM method D 412 at 23° C. and an extension rate of 50 mm/min. Five samples were tested, the results being averaged and presented in Table 1.

(COMPARATIVE) EXAMPLE A2

The procedure of Comparative Example A1 was repeated wherein 0.15 g of IRGANOX™ 1010 was added to the PET 1/BASE 1 blend after a mixing time of 8.5 minutes (torque=1,400 m-g). The torque decreased over the next 10.5 minutes to a level of 1,200 m-g. (material temperature=263° C.). The resulting physical blend was molded and tested as in Comparative Example A1 and results are presented in Table A1.

(COMPARATIVE) EXAMPLE A3

The procedure of Comparative Example A2 was repeated wherein 2.29 g of X-LINKER 1 were added to the PET 1/BASE 1/IRGANOX™ 1010 blend at approximately 12 minutes into the run. A torque of 1,100 m-g was recorded just after adding the crosslinker as well as for the remaining 11 minutes of processing (material temperature=262° C.). The resulting physical blend was molded and tested as above and results are presented in Table A1.

EXAMPLE A4

PET 1 was dried at 120° C. for 6 hours to provide a resin having a moisture content of 0.003%. BASE 1 (120.2 g) was mixed at 100 rpm/setting of 250° C., as described above. After 4 minutes, 80.0 g of the dried PET 1 were added and this combination mixed for 3 more minutes, whereupon 0.15 g of IRGANOX™ 1010 was added. This combination was mixed for 4 minutes and 2.31 g of X-LINKER 1 were added. Mixing was continued for another 6 minutes and 1.13 g (63 drops) of CATALYST 1 were added. Within two minutes the torque increased from 1,200 m-g to a maximum of 6,500 m-g. After the mixing was completed (24 minutes total) the material temperature was 281° C. This TPSiV was molded and tested as above and results are presented in Table A1.

TABLE A1

| Example | Tensile Strength (MPa) | Elongation (%) |
|---|---|---|
| (Comp.) Ex. A1 | 1.37 | 13 |
| (Comp.) Ex. A2 | 0.92 | 11 |
| (Comp.) Ex. A3 | 1.0 | 9 |
| Ex. A4 | 12.3 | 246 |

It can be seen from Table A1 that the physical blends had significantly inferior mechanical properties relative to the TPSiV of Example A4.

EXAMPLES A5–A7

BASE 1 (120.0 g) was mixed at 60 rpm/setting of 250° C., as described in Example A4 but employing a nitrogen purge at a flow rate of 10 SCFH (0.00472 m$^3$/min). After 4 minutes, 80.0 g of PET 1(dried at 120° C./6 hours) were added and mixing was continued for another 3 minutes, whereupon 0.16 g of IRGANOX™ 1010 was added. This combination was mixed for 5 minutes and then 1.20 g of X-LINKER 1 were added. The combination was mixed for an additional 6 minutes and 0.565 g (31 drops) of CATALYST 1 was introduced. Torque increased from 1,200 m-g to a maximum value of 4,100 m-g. Total processing time was 40 minutes and final material temperature was 270° C. (Example A5).

The procedures of Example A5 were followed wherein the level of X-LINKER 1 was varied, as shown in the second column of Table A2. Process time for Examples A6 and A7 were 30 min. and 26 min., respectively. Each resulting TPSiV was molded and tested, as described above, and the results are shown in Table A2.

TABLE A2

| Example | X-LINKER 1: (Grams) | Tensile Strength (MPa) | Elongation (%) | Maximum Torque (m-g) |
|---|---|---|---|---|
| A5 | 1.2 | 5.6 | 47 | 4,100 |
| A6 | 2.3 | 8.8 | 120 | 6,000 |
| A7 | 4.59 | 9.6 | 134 | 10,000 |

EXAMPLE A8

One hundred grams of BASE 1 were mixed at 100 rpm/setting of 250° C., as described in Example A4. After 4 minutes, 100 g of PET 1 (dried at 150° C./5 hours) were introduced and mixed for another 4 minutes, at which time 0.19 g of IRGANOX™ 1010 was added. Mixing was continued for an additional 4 minutes and then 1.85 g of X-LINKER 1 was added. Six minutes later, 0.94 g (52 drops) of CATALYST 1 was added and the torque increased from 900 m-g to 4,900 m-g in about 1 minute, at which point processing was terminated. The resulting material was molded and tested, as before, the results being presented in Table A3.

EXAMPLE A9

One hundred and forty grams BASE 1 were mixed at 100 rpm/setting of 250° C., as described in Example A4. After 4 minutes, 60 g of PET 1 (dried at 150° C./5 hours) were added and mixing was continued for another 4 minutes, at which time 0.11 g of IRGANOX™ 1010 was added. This combination was mixed for an additional 4 minutes whereupon 2.67 g of X-LINKER 1 were added (i.e., same ratio of crosslinker to silicone base as in Examples A4 and A8). Six minutes later, 1.32 g (73 drops) of CATALYST 1 were added. Torque increased from 1,300 m-g to 7,000 m-g within about 2 minutes, at which point processing was terminated. The resulting material was molded and tested, as before, the results being presented in Table A3.

TABLE A3

| Example | BASE 1/PET 1 Weight Ratio | Tensile Strength (MPa) | Elongation (%) |
|---|---|---|---|
| A8 | 50/50 | 12.6 | 152 |
| A4 | 60/40 | 12.3 | 246 |
| A9 | 70/30 | 9.3 | 248 |

EXAMPLES A10–A13

The procedures of Example A4 were repeated using different grades of poly(ethylene terephthalate) and employing a nitrogen purge at a flow rate of 0.00472 m³/min. Mechanical properties of the resulting TPSiVs are presented in Table A4.

TABLE A4

| Example | Resin | Tensile Strength (MPa) | Elongation (%) |
|---|---|---|---|
| A10 | PET 2 | 9.2 | 120 |
| A11 | PET 3 | 8.6 | 116 |
| A12 | PET 4 | 9.3 | 110 |
| A13 | PET 5 | 5.3 | 47 |

EXAMPLE A14

BASE 2 (120.0 g) was mixed for 3 minutes at 100 rpm/setting of 250° C., as described above. After another 3 minutes, 80.0 g of PET 1(dried at 130° C./4.5 hours) were added and mixing was continued for 4 more minutes, whereupon 0.15 g of IRGANOX™ 1010 was added. This combination was mixed for 5 minutes and then 2.53 g of X-LINKER 1 were added. The combination was mixed for an additional 6 minutes and 1.24 g (69 drops) of CATALYST 1 were introduced. Torque increased from 900 m-g to a maximum value of 6,000 m-g. Total processing time was 21 minutes and final TPSiV temperature was 267° C. The resulting material was molded and tested, as before, and exhibited a tensile of 7.0 MPa and elongation of 91%.

EXAMPLE A15

PDMS 2 (120.0 g) was mixed for 4 minutes at 100 rpm/setting of 250° C., as described above. After another 4 minutes, 80.0 g of PET 1(dried at 130° C./4.5 hours) were added and mixing was continued for 3 more minutes, whereupon 0.15 g of IRGANOX™ 1010 was added. This combination was mixed for 5 minutes and then 3.01 g of X-LINKER 1 were added. The combination was mixed for an additional 6 minutes and 1.50 g (83 drops) of CATALYST 1 were introduced. Torque increased from 600 m-g to a maximum value of 5,300 m-g. Total processing time was 22 minutes and final TPSiV temperature was 270° C. The resulting material was molded and tested, as before, and exhibited a tensile of 4.8 MPa and elongation of 79%.

EXAMPLES A16–A22

TPSiVs based on PET 1 were prepared according to the procedure of Example A4 with the exception that the resin was not dried (moisture content varied between 0.12 and 0.13%), CATALYST 2 was used at a level of 0.25 g (14 drops) and crosslinker at a level 5.4 g. IRGANOX™ 1010 stabilizer was either omitted or included, as indicated in the second column of Table A5. The resulting compositions were molded and tested, as before, and the mechanical properties are also presented in Table A5.

TABLE A5

| Example | IRGANOX ™ 1010 Included | Set Temp. (° C.) | Tensile (MPa) | Elongation (%) |
|---|---|---|---|---|
| (Comp.) Ex. A16* | NO | 275 | 4.7 | 16 |
| (Comp.) Ex. A17* | NO | 250 | 7.1 | 56 |
| (Comp.) Ex. A18 | NO | 250 | 6.4 | 48 |
| (Comp.) Ex. A19 | NO | 250 | 4.8 | 42 |
| Example A20 | YES | 250 | 11 | 227 |
| (Comp.) Ex. A21 | NO | 250 | 4.3 | 9 |
| Example A22 | YES | 250 | 10 | 177 |

*Order of addition was resin, followed by silicone base.

It can be seen from Table A5 that TPSiVs which included the stabilizer had considerably better mechanical properties than corresponding systems wherein this component was omitted.

(COMPARATIVE) EXAMPLE B1

One hundred and twenty grams of BASE 1 were mixed at 100 rpm/setting of 250° C., as described above. After 2 minutes, 80.0 g of PEN (dried at 170° C./6 hours; water content=0.001%) were added. The torque was 1,200 m-g at 8 minutes into the run, at which point the resin was fully melted and a uniform physical blend of silicone and resin was observed. Torque decreased to 1,000 m-g during the remaining 10 minutes of processing and final material temperature was 278° C. This physical blend was molded at 280° C. and tested, as described above, the results being presented in Table B1.

(COMPARATIVE) EXAMPLE B2

A physical blend was prepared as in Comparative Example B1 with the exception that 0.16 g of IRGANOX™ 1010 was added to the PEN/BASE 1 blend at 4 minutes into the run. Torque was 1,200 m-g at 7.5 minutes and then decreased over the next 11.5 minutes to 1,000 m-g, at which time processing was terminated (material temperature was 278° C.). Mechanical testing results are shown in Table B1.

(COMPARATIVE) EXAMPLE B3

A physical blend was prepared as in Comparative Example B2 with the exception that 2.24 g of X-LINKER 1 were added to the PEN/BASE 1/IRGANOX™ 1010 blend at 12 minutes into the run. Torque was 1,000 m-g just after adding the crosslinker and remained at that level for the remaining 7 minutes of processing. At completion, material temperature was 276° C. Mechanical testing results are shown in Table B1.

EXAMPLE B4

One hundred and twenty grams of BASE 1 were mixed at 100 rpm/setting of 250° C., as described in Example B1 and, after 2 minutes, 80.0 g of PEN (dried at 170° C./4.5 hours) were added. This combination was mixed for another 2 minutes, 0.16 g of IRGANOX™ 1010 was added and mixing was continued for 8 minutes, whereupon 2.33 g of X-LINKER 1 were added. After another 6 minutes of mixing, 1.13 g (63 drops) CATALYST 1 were added. Torque increased from 1,600 m-g to a maximum of 7,000 m-g. When processing was complete (20 minutes total), the material temperature was 280° C. Mechanical testing results on this TPSiV are shown in Table B1.

(COMPARATIVE) EXAMPLE B5

A TPSiV was prepared as in Example B4 with the exception that the IRGANOX™ 1010 was omitted. Mechanical testing results on this TPSiV are shown in Table B1.

TABLE B1

| Example | Tensile Strength (MPa) | Elongation (%) |
|---|---|---|
| (Comp.) Ex. B1 | 0.6 | 8 |
| (Comp.) Ex. B2 | 0.8 | 9 |
| (Comp.) Ex. B3 | 0.9 | 9 |
| Example B4 | 9.9 | 79 |
| (Comp.) Ex. B5 | 8.3 | 47 |

It can be seen from Table B1 that the physical blends (Comparative Examples B1–B3) had dramatically inferior mechanical properties relative to the TPSiV according to the invention (Example B4). Furthermore, these properties were also reduced when the hindered phenol was not included (Comparative Example B5).

(COMPARATIVE) EXAMPLE C1

BASE 1 (144.0 g) was mixed at 100 rpm using a Haake™ 9000 bowl mixer (roller blades) at a temperature setting of 240° C. After 4 minutes, 96.0 g of PTT (dried at 150° C./4; moisture content=0.002%) were added. At the 7 minute mark, 0.20 g of IRGANOX™ 1010 was added, followed by the addition of 2.71 g of X-LINKER 1 at 12 minutes. Torque increased from 1,800 m-g to 2,400 m-g during the remaining 24 minutes of processing. The final physical blend had a temperature of 245° C. This blend was molded for 4 minutes at 10 tons (99 KPa) and 250° C., followed by cold pressing for an additional 4 minutes. Test results are indicated in Table C1

EXAMPLE C2

BASE 1 (144.0 g) was mixed at 100 rpm using a Haake™ 9000 bowl mixer at a temperature setting of 240° C. After 4 minutes, 96.0 g of PTT (dried at 150° C./4 hours; moisture content=0.002%) were added. At the 7 minute mark, 0.20 g of IRGANOX™ 1010 was added and mixed for an additional 5 minutes, at which point 2.74 g of X-LINKER 1 were introduced. This combination was mixed for another 6 minutes and then 1.35 g (75 drops) of CATALYST 1 were added, whereupon the torque increased from 2,200 m-g to a maximum value of 12,000 m-g. After a total process time of 20 minutes the resulting TPSiV temperature was 261° C. This composition was molded and tested as described in (Comparative) Example C1 and results are given in Table C1.

EXAMPLE C3

BASE 1 (168.0 g) was mixed at 100 rpm using a Haake™ 9000 bowl mixer at a temperature setting of 240° C. After 4 minutes, 72.1 g of PTT (dried at 150° C./4 hours; moisture content=0.002%) were added. At the 7 minute mark, 0.15 g of IRGANOX™ 1010 was added and mixed for an additional 5 minutes, at which point 3.2 g of X-LINKER 1 were introduced. This combination was mixed for another 6 minutes and then 1.58 g (88 drops) of CATALYST 1 were added, whereupon the torque increased from 2,600 m-g to a maximum value of 10,000 m-g. After a total process time of 20 minutes the resulting TPSiV temperature was 254° C. This composition was molded and tested as described in (Comparative) Example C1 and results are given in Table C1.

TABLE C1

| Example | BASE 1/PTT Ratio | Tensile Strength (MPa) | Elongation (%) |
|---|---|---|---|
| (Comp.) Ex. C1 | 60:40 (Physical Blend) | 1.8 | 7 |
| Ex. C2 | 60:40 | 15.2 | 192 |
| Ex. C3 | 70:30 | 10.7 | 154 |

(COMPARATIVE) EXAMPLE D1

BASE 1 (144.0 g) was mixed for 3 minutes at 100 rpm and a temperature setting of 20° C. using roller blades and a nitrogen purge flow rate of 0.5 SCFM (0.0142 m$^3$/min.), whereupon 0.36 g of IRGANOX™ 1010 was added. At the 6 minute mark, 2.72 g of X-LINKER 1 were added followed by 96.0 g of PCT resin (dried at 150° C./7.5 hours), the latter being added 12 minutes into the run. This combination was mixed for an additional 5 minutes and the resulting "cold blend" was then removed from the mixer.

The above described cold blend (240 g) was charged to a mixer and mixed at 100 rpm at a temperature setting of 270° C. for 11.5 minutes using a nitrogen purge (0.0142 m$^3$/min.). The resulting physical blend was molded and tested, the mechanical properties being presented in Table D1.

EXAMPLE D2

BASE 1 (144.0 g) was mixed for 3 minutes at 100 rpm/temperature setting of 20° C., as described above, using a nitrogen purge flow rate of 0.5 SCFM (0.0142 m$^3$/min.) in a Haake™ 9000 mixer (310 ml volume, roller blades) whereupon 0.37 g of IRGANOX™ 1010 was added. At the 6 minute mark 2.67 g of X-LINKER 1 were added followed by 96.0 g of PCT resin (dried at 100° C./6 hours; moisture content=0.025%), the latter being added 12 minutes into the run. Mixing was continued for an additional 4 minutes and the resulting "cold blend" removed.

The above-described cold blend (240.0 g) was mixed at 100 rpm/temperature setting of 270° C. (under nitrogen at 0.0142 m$^3$/min.) for 7 minutes and 1.35 g (75 drops) CATALYST 1 were then introduced. Torque increased from 1,800 m-g to a maximum of 9,800 m-g. Upon completion (total process time=9.5 minutes) the material temperature was 295° C. The resulting TPSiV was molded and tested, the mechanical properties being presented in Table D1.

(COMPARATIVE) EXAMPLE D3

A composition having the same proportions of ingredients as described in Example D2 was prepared without benefit of the cold blend procedure. The resulting TPSiV was molded and tested, as described above, the mechanical properties being presented in Table D1.

EXAMPLE D4

A TPSiV based on PCT was prepared by mixing 120.2 g of BASE 1 and 1 g of IRGANOX™ 1010 at 100 rpm, set temperature of 295° C. and $N_2$ flow of 0.014 $m^3$/min in a Haake™ 9000 Internal mixer. Eighty grams of PCT (dried at 100° C. for 8 hours to provide a resin having a moisture content of 0.013%) were added and this combination was mixed for about 6 minutes, whereupon 4.58 g of X-LINKER 1 were added. Mixing was continued for another 4 minutes and 2 g of CATALYST 1 were added. Within one minute the torque increased from 2,200 m-g to a maximum of 14,000 m-g. The resulting material was molded and tested as above and the results are shown in Table D1.

TABLE D1

| Example | Tensile Strength (MPa) | Elongation (%) |
| --- | --- | --- |
| (Comp.) Ex. D1 | Not Measurable | Not Measurable |
| Ex. D2 | 6.3 | 60 |
| (Comp.) Ex. D3 | 6.8 | 21 |
| Example D4 | 9.8 | 38 |

These examples illustrate the type of routine experimentation sometimes needed to determine the appropriate level of stabilizer commensurate with a TPSiV having an elongation of at least 30%. They also illustrate the advantage of the above-described cold-blend procedure when the resin melt point approaches the 300° C. limit of the invention.

(COMPARATIVE) EXAMPLE E1

In a first procedure, BASE 1 (166.6 g) was mixed at 100 rpm/setting of 250° C. in a Polylab™ 2 bowl mixer (300 ml bowl, roller blades). After 2 minutes, 0.6 g of IRGAFOS™ 168 was added. After another 6 minutes of homogenization, 3.76 g of X-LINKER 1 was added. Torque remained steady (2,750–3,000 m-g) until the addition of 52 drops of CATALYST 1. A minute after addition of catalyst solution, torque rose from 2,800 to 4,900 m-g and subsequently dropped to 3,500 m-g. This illustrates the observation that this phosphite stabilizer prevents a mixture of silicone base and crosslinker from crosslinking prematurely under the above conditions. However, incorporation of this stabilizer does allow the silicone to crosslink after addition of catalyst, as in the case of stabilization with hindered phenol according to the invention.

In a second procedure, 120 g of BASE 1 were mixed at 100 rpm's using a Haake Polylab™ bowl mixer at a temperature setting of 250° C. for 2 minutes prior to adding 0.61 g of IRGAFOS™ 168. After about a minute of homogenization, 80.0 g of PET 1 (dried at 150° C. for 7 hours) were added. This combination was blended for another 9 minutes prior to adding 2.28 g of X-LINKER 1. After another 6 minutes of homogenization, 63 drops of CATALYST 1 were added. Two minute after the addition of catalyst solution, torque rose from 1,000 to 6,500 m-g. The resulting TPSiV was molded and tested as described above and exhibited an elongation of 29% and tensile of 4.9 Mpa.

(COMPARATIVE) EXAMPLE E2

The first procedure of (Comparative) Example E1 was repeated wherein WESTON™ W618G stabilizer replaced the IRGAFOS™ 168. In this case, it was observed that the stabilizer did not prevent premature crosslinking of silicone (i.e., the silicone base crosslinked without addition of catalyst).

An attempt to prepare a TPSiV based on PET 1 using the WESTON™ W618G stabilizer in place of IRGAFOS™ 168, as described in (Comparative) Example E1, resulted in a composition having an elongation of 9% and a tensile of 2.8 MPa.

(COMPARATIVE) EXAMPLES F1–F4

TPSiVs based on LCP resin were prepared according to the methods described in Example A4 wherein mixing was carried out at a set point of 336° C. and the amount of IRGANOX™ 1010 was varied, as shown in Table E1. Mechanical test results on samples molded at 350° C. are also presented in this table.

TABLE F1

| | (Comparative) Example | | | |
| --- | --- | --- | --- | --- |
| | F1 | F2 | F3 | F4 |
| Composition: | | | | |
| BASE 1 (g) | 120.2 | 120.2 | 120.7 | 120.33 |
| LCP (g) | 80.2 | 80.0 | 80.1 | 80.22 |
| IRGANOX ™ 1010 (g) | 0 | 0.15 | 0.5 | 1.0 |
| X-LINKER 1 (g) | 2.3 | 2.23 | 2.3 | 2.24 |
| CATALYST 1 (drops) | 63 drops | 63 drops | 63 drops | 63 drops |
| Properties: | | | | |
| Tensile Strength (MPA) | 7.4 | 7.4 | 20.6 | 17.3 |
| Elongation (%) | 8 | 7 | 26 | 24 |
| Ultimate torque (m-g) | 4,300 | 2,800 | 7,500 | 6700 |

It is seen from Table F1 that a thermoplastic elastomer according to the invention could not be prepared from the LCP resin without the use of a stabilizer. Moreover, even the use of a relatively large proportion of stabilizer did not result in a TPSiV having an elongation of at least 30%.

What is claimed is:

1. A method for preparing a thermoplastic elastomer, said method comprising:
   (I) mixing
   (A) a thermoplastic resin comprising more than 50 percent by volume of a polyester resin other than poly (butylene terephthalate), said thermoplastic resin having a softening point of 23° C. to 300° C.,
   (B) a silicone elastomer comprising
      (B') 100 parts by weight of a diorganopolysiloxane gum having a williams plasticity number of at least 30 and having an average of at least 2 alkenyl groups in its molecule and, optionally,
      (B") up to 200 parts by weight of a reinforcing filler, the weight ratio of said silicone elastomer to said thermoplastic resin being greater than 35:65 to 85:15,
   (C) 0.02 to 5 parts by weight of a stabilizer for each 100 parts by weight of said thermoplastic resin and said silicone elastomer, said stabilizer being selected from hindered phenols; thioesters; hindered amines; 2,2'-(1, 4-phenylene)bis(4H-3, 1-benzoxazin-4-one); or 3,5-di-tert-butyl-4-hydroxybenzoic acid, hexadecyl ester,
- (D) an organohydrido silicon compound which contains an average of at least 2 silicon-bonded hydrogen groups in its molecule and
- (E) a hydrosilation catalyst, components (D) and (E) being present in an amount sufficient to cure said diorganopolysiloxane (B'); and
- (II) dynamically curing said diorganopolysiloxane (B'), wherein at least one property of the thermoplastic elastomer selected from tensile strength or elongation is at least 25% greater than the respective property for a corresponding simple blend wherein said diorganopolysiloxane is not cured and said thermoplastic elastomer has an elongation of at least 30%.

2. The method according to claim 1, wherein said polyester resin is poly(ethylene terephthalate).

3. The method according to claim 1, wherein said polyester resin is selected from poly(trimethylene terephthalate), poly(ethylene naphthalate), poly(butylene naphthalate) or poly(cyclohexylenedimethylene terephthalate).

4. The method according to claim 1, wherein the weight ratio of said silicone elastomer (B) to said thermoplastic resin (A) is greater than 35:65 to 75:25.

5. The method according to claim 1, wherein a pre-mix of components (A) through (C) and, optionally, component (D) is first prepared at a temperature below the softening point of said resin (A), said catalyst (E) is subsequently added to said pre-mix at a temperature above the softening point of said resin (A) and said diorganopolysiloxane (B') is then dynamically vulcanized.

6. The method according to claim 1, wherein said diorganopolysiloxane (B') is a gum selected from the group consisting of a copolymer consisting essentially of dimethylsiloxane units and methylvinylsiloxane units and a copolymer consisting essentially of dimethylsiloxane units and methylhexenylsiloxane units and said reinforcing filler (B") is a fumed silica.

7. The method according to claim 6, wherein said organohydrido silicon component (D) is selected from the group consisting of a polymer consisting essentially of methylhydridosiloxane units and a copolymer consisting essentially of dimethylsiloxane units and methylhydridosiloxane units, having 0.5 to 1.7 weight percent hydrogen bonded to silicon and having a viscosity of 2 to 500 mPa-s at 25° C. and said catalyst (E) is a neutralized complex of platinous chloride and divinyltetramethyldisiloxane.

8. The method according to claim 7, wherein the weight ratio of said silicone elastomer (B) to said resin (A) is 40:60 to 70:30.

9. The method according to claim 1, wherein said stabilizer is a thioester selected from distearyl 3,3'-thiodipropionate, dilauryl-3,3'-thiodipropionate or ditridecyl 3,3'-thiodipropionate.

10. The method according to claim 1, wherein said stabilizer is a hindered amine selected from 1,6-hexanediamine, N,N'-bis(2,2,6,6-pentamethyl-4-piperidinyl)-, polymers with morpholine-2,4,6-trichloro-1,3,5-triazine; 1,6-hexanediamine, N,N'-bis(2,2,6,6-tetramethyl-4-piperidinyl)-, polymers with 2,4,-dichloro-6-(4-morpholinyl)-1,3,5-triazine; bis(1,2,2,6,6-pentamethyl-4-piperidinyl) sebacate; bis(2,2,6,6-tetramethyl-4-piperidinyl) sebacate; dimethyl succinate polymer with 4-hydroxy-2,2,6,6-tetramethyl-1-piperidine ethanol; or polymethyl (propyl-3-oxy-(2',2',6',6'-tetramethyl-4'-piperidinyl) siloxane.

11. The method according to claim 1, wherein said stabilizer is selected from 2,2'-(1,4-phenylene)bis(4H-3,1-benzoxazin-4-one); or 3,5-Di-tert-butyl-4-hydroxybenzoic acid, hexadecyl ester.

12. The method according to claim 1, wherein said stabilizer is a hindered phenol having at least one group of the formula in its molecule, in which Q is a monovalent organic group having 1 to 24 carbon atoms selected from
- (i) hydrocarbon groups,
- (ii) hydrocarbon groups which optionally contain heteroatoms selected from sulfur, nitrogen or oxygen or
- (iii) halogen-substituted versions of (i) or (ii), wherein the benzene ring of said formula may additionally be substituted with at least one Q group.

13. The method according to claim 12, wherein said stabilizer is a hindered phenol having at least one group of the formula in its molecule, wherein R is an alkyl group having one to four carbon atoms, R' is a hydrocarbon group having 4 to 8 carbon atoms and wherein the benzene ring of said formula may be optionally further substituted with a hydrocarbon group having 1 to 24 carbon atoms.

14. The method according to claim 13, wherein said diorganopolysiloxane (B') is a gum selected from the group consisting of a copolymer consisting essentially of dimethylsiloxane units and methylvinylsiloxane units and a copolymer consisting essentially of dimethylsiloxane units and methylhexenylsiloxane units and said reinforcing filler (B") is a fumed silica.

15. The method according to claim 14, wherein said hindered phenol is selected from tetrakis(methylene(3,5-di-tert-butyl-4-hydroxy-hydrocinnamate))methane, N,N'-hexarnethylenebis(3,5-di-tert-butyl-4-hydroxyhydrocinnamamide) or 1,1,3-Tris(2'-methyl-4'-hydroxy-5'-t-butylphenyl)butane.

16. The method according to claim 15, wherein the weight ratio of said silicone elastomer (B) to said thermoplastic resin (A) is 40:60 to 70:30.

17. The method according to claim 1, wherein a fire retardant is included in mixing step (I).

18. A thermoplastic elastomer prepared by the method of claim 1.

19. A thermoplastic elastomer prepared by the method of claim 2.

20. A thermoplastic elastomer prepared by the method of claim 3.

21. A thermoplastic elastomer prepared by the method of claim 4.

22. A thermoplastic elastomer prepared by the method of claim 5.

23. A thermoplastic elastomer prepared by the method of claim 6.

24. A thermoplastic elastomer prepared by the method of claim 7.

25. A thermoplastic elastomer prepared by the method of claim 8.

26. A thermoplastic elastomer prepared by the method of claim 9.

27. A thermoplastic elastomer prepared by the method of claim 10.

28. A thermoplastic elastomer prepared by the method of claim 11.

29. A thermoplastic elastomer prepared by the method of claim 12.

30. A thermoplastic elastomer prepared by the method of claim 13.

31. A thermoplastic elastomer prepared by the method of claim 14.

32. A thermoplastic elastomer prepared by the method of claim 15.

33. A thermoplastic elastomer prepared by the method of claim 16.

34. A thermoplastic elastomer prepared by the method of claim 17.

* * * * *